United States Patent
Kober et al.

(10) Patent No.: US 10,406,954 B2
(45) Date of Patent: Sep. 10, 2019

(54) STRAIGHT GUIDE AND HEADREST WITH STRAIGHT GUIDE

(71) Applicants: Steve Kober, Treuen (DE); Sebastian Schmitt, Nuremberg (DE)

(72) Inventors: Steve Kober, Treuen (DE); Sebastian Schmitt, Nuremberg (DE)

(73) Assignee: GRAMMER AG, Amberg (DE)

( * ) Notice: Subject to any disclaimer, the term of this patent is extended or adjusted under 35 U.S.C. 154(b) by 0 days.

(21) Appl. No.: 15/812,280

(22) Filed: Nov. 14, 2017

(65) Prior Publication Data

US 2018/0134197 A1    May 17, 2018

(30) Foreign Application Priority Data

Nov. 17, 2016    (DE) .................... 10 2016 013 722

(51) Int. Cl.
| | |
|---|---|
| *B60N 2/815* | (2018.01) |
| *B60N 2/818* | (2018.01) |
| *B60N 2/894* | (2018.01) |
| *B60N 2/897* | (2018.01) |
| *B60N 2/865* | (2018.01) |

(52) U.S. Cl.
CPC ............ *B60N 2/815* (2018.02); *B60N 2/818* (2018.02); *B60N 2/865* (2018.02); *B60N 2/894* (2018.02); *B60N 2/897* (2018.02)

(58) Field of Classification Search
CPC ........ B60N 2/815; B60N 2/894; B60N 2/818; A47C 7/38
USPC ........................................ 297/410
See application file for complete search history.

(56) References Cited

U.S. PATENT DOCUMENTS

| | | | | |
|---|---|---|---|---|
| 3,563,602 | A | * | 2/1971 | Ohta ............... B60N 2/818 297/410 |
| 7,316,455 | B2 | | 1/2008 | Metz |
| 7,562,936 | B1 | * | 7/2009 | Veine ............... B60N 2/815 297/410 |
| 9,004,602 | B2 | | 4/2015 | Gottwald |
| 2006/0214491 | A1 | * | 9/2006 | Metz ............... B60N 2/815 297/410 |

(Continued)

FOREIGN PATENT DOCUMENTS

DE    29613073 U    10/1996

*Primary Examiner* — Gary C Hoge
(74) *Attorney, Agent, or Firm* — Andrew Wilford

(57) ABSTRACT

Among other things, the invention relates to a straight guide with at least two support rods (12*a*, 12*b*), wherein each support rod is movably guided within amount (15*a*, 15*b*) and can be secured with a latch (16) with relation to the amount (15*a*, 15*b*), wherein the latch (16) comprises at least one elastically deformable strip (17) that is permanently arranged relative to the mount, having at least one freely movable end section (18*a*, 18*b*), wherein each end section (18*a*, 18*b*) interacts with at least one notch (23).

Figure 1:
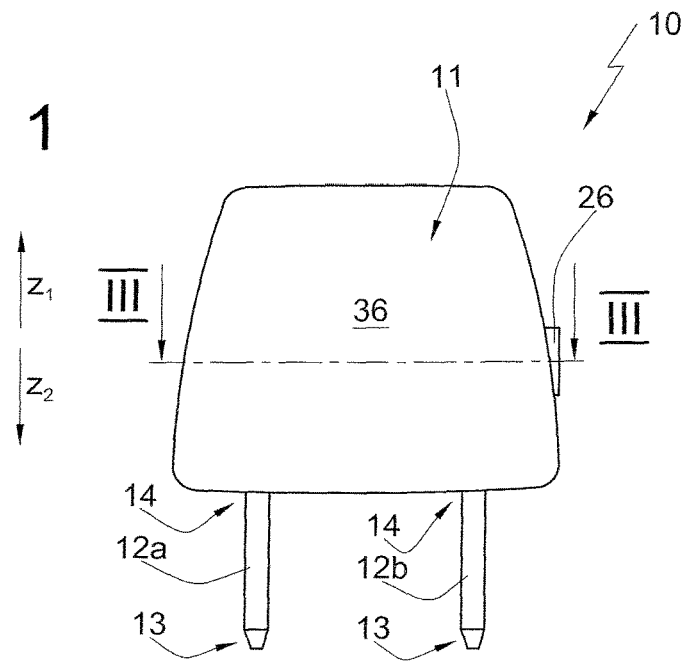

It was the object of the invention to create a straight guide with a latch, where the possibilities of arranging an actuation of the latch are more versatile.

The uniqueness lies in the fact that the actuator comprises a slider (27) with at least one actuating projection (33) that can be moved in at least one first direction (x1, x2), and in at least one second direction (y1, y2) and that a movement actuator (34) is provided that redirects the slider (27) into the first direction in such a way when it is moved into the second direction (y1, y2) that the actuating projection (33) moves the latch (16) into the released position.

9 Claims, 3 Drawing Sheets

(56) References Cited

U.S. PATENT DOCUMENTS

| | | | | |
|---|---|---|---|---|
| 2015/0123445 A1* | 5/2015 | Mueller | ............... | B60N 2/815 |
| | | | | 297/410 |
| 2017/0120786 A1* | 5/2017 | Cao | ...................... | B60N 2/80 |
| 2017/0334327 A1* | 11/2017 | Diefenthaler | ........ | B60N 2/812 |
| 2018/0022249 A1* | 1/2018 | Schwerma | ............. | A47C 7/38 |
| | | | | 297/410 |

* cited by examiner

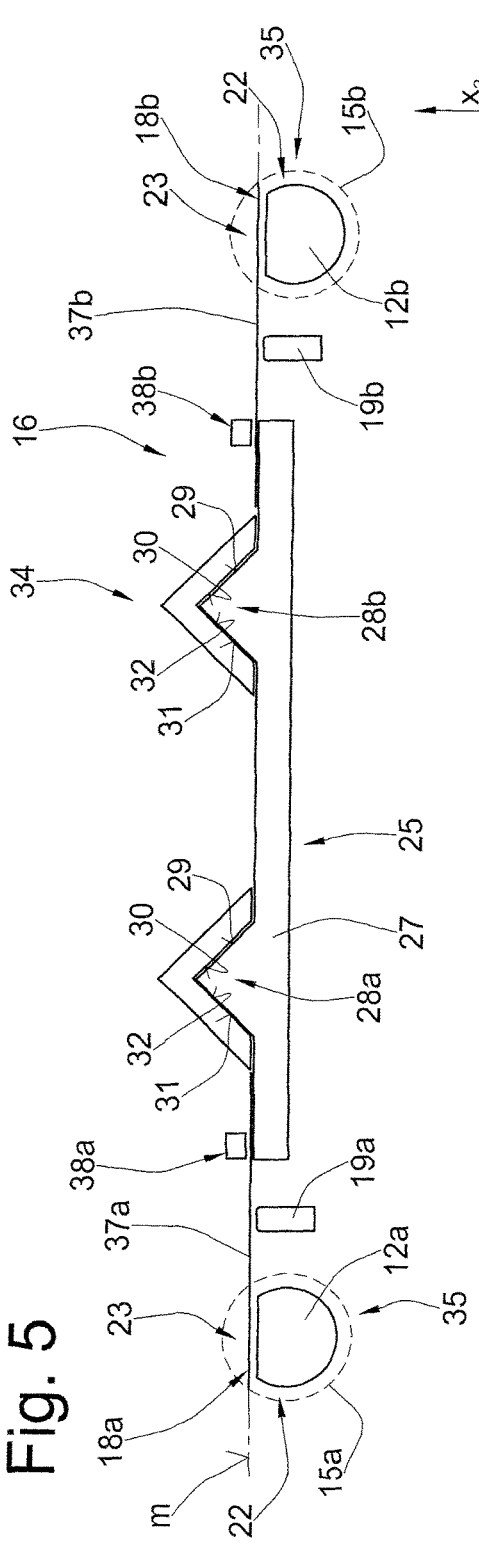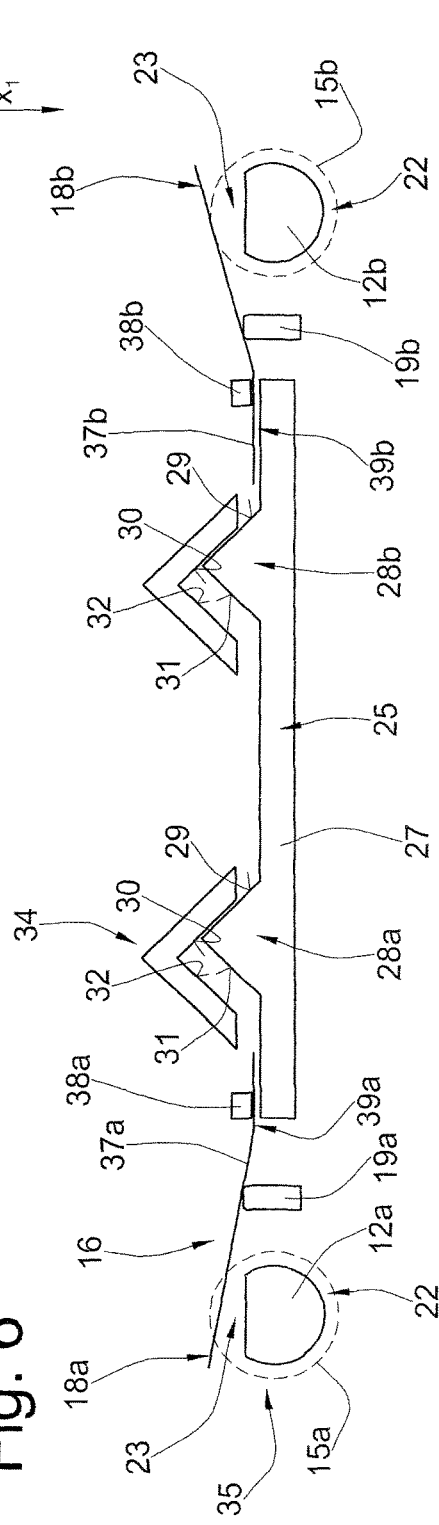

STRAIGHT GUIDE AND HEADREST WITH STRAIGHT GUIDE

The invention initially relates to a straight guide. Such a straight guide is used, for example, in the case of headrests.

A headrest is known, for example, from prior notorious use, where a head part is permanently connected using support rods. The support rods have free end sections that are moveably mounted within the guides that are permanently connected to the vehicle seat. In the end sections, a plurality of detent recesses are formed that interact with the catch elements of the guiding system.

From DE 296 13 073 U1, an apparatus for locking a headrest is known where support rods are introduced into mounts in an adjustable manner and can be locked by means of a latch at various height positions. The latch comprises a spring wire that is permanently held on the head part that meshes with the notched catches of the support rods when the wire is in a slackened state. The spring wire is positioned at two abutments so that actuating the spring wire in a central segment, transverse to a longitudinal axis of the spring wire functionally deforms the spring wire into a bent shape so that the ends of the spring wire move out of the catch to notches, thereby resulting in the head part being height adjustable.

It was the object of the invention to create a straight guide with a latch, where the possibilities of arranging an actuation of the latch are more versatile. The task was solved with a straight guide with the features of claim 1.

The straight guide comprises at least two support rods, wherein each support rod is movably guided within a mount and can be secured with a latch relative to the mount. A "straight guide" in terms of the invention can, for example, mean that the mount is movably guided with relation to a straight support bar or one that is bent at least in sections. The latch comprises at least one elastically deformable strip, that is permanently arranged with relation to the mount, having at least one end section that can be freely moved. That means the latch comprises, for example, a strip with two free end sections. In accordance with an alternative, the latch, for example, comprises two strips that each have at least one free end section. Each free end section interacts with a structure of one of the two support rods that comprises at least one notch.

The latch can be adjusted between a released position and a locked position. In the release position, the strip is functionally deformed in such a way that the end segments do not mesh with the array, meaning that they do not mesh with the notches. In the locked position, the end sections mesh with the structure, meaning that they mesh with one of the notches of the structure. Thereby, the strip, for example is in a relaxed state or is not subject to any pretension.

The latch comprises an actuator. In a first position of the actuator, the latch is moved into the released position by the actuator. In a second position of the actuator, the latch is not actuated so that the latch can be moved into the locked position. This can, for example, occur by the strip slackening due to its elastic restoring force, wherein the end sections of the strip are moved into the notches or adjacent to the notches in contact with the outer surface of the support rod. In the case of a slight movement of the head part, the end sections snap into the notch.

The restoring force of the spring can, for example, force the actuator back into the first position so that, when pressure on the actuator is eased, the latch automatically moves back into the locked position and the actuator automatically moves back into the first position.

The actuator comprises a slider with at least one actuating projection that can be moved in both a first direction, for example, transversely to a longitudinal axis of the strip, and in a second direction, for example, parallel to the longitudinal axis. When actuating into the second direction, a movement deflector redirects the slider into the first direction in such a way that the actuating projection moves the latch into the released position.

In this way, the actuation system can be flexibly arranged on the head part and, by means of the movement deflector, be redirected into the desired actuation direction of the latch.

One embodiment is characterized in that the strip is supported by two abutments and that the actuating projection interacts with a central section of the strip. The actuating projection is, for example capable of exerting a force onto the strip that opposes the abutments. Thereby, the force acts between the two abutments on the strip. In this way, the strip bends so that, for example, the end sections of the strip move to disengage with the structure of notches of the respective support rod.

An alternative embodiment is characterized in that the slider comprises two actuating projections, wherein each actuating projection interacts with an end section. Each end section of the strip interacts with the actuating projection of the slider. The end sections can then be moved, for example from the actuating projections into the released position.

Another embodiment is characterized in that the movement deflector comprises at least a first deflection surface and at least a first countersurface, wherein the first deflection surface and the first countersurface are designed to be diagonal to the second direction in such a way that they redirect the slider into the first direction in the case of a movement into the second direction. In the case of a movement of the slider into the second direction, the slider is then deflected from both the deflection surface and the countersurface into the first direction.

An embodiment of the invention is characterized in that the deflection surface is assigned a permanent structure relative to the mount and the countersurface is part of the slider. The countersurface can be moved relative to the permanent structure. The permanent structure can, for example, be the head part of a head, relative to which the slider is moveably arranged.

Another embodiment is characterized in that, in addition to the first deflection surface in the first countersurface, a second deflection surface and a second countersurface are arranged. The second deflection surface and the second countersurface are designed to be diagonal to the second direction in such a way that they redirect the slider into a first direction in the case of a movement into the third direction. The third direction opposes the second direction for example. The slider can then be moved into the second direction or into a direction that opposes the second direction in order to move the latch into the released position. In this way, for example, it is possible to actuate the latch from various sides in the case of a headrest.

One embodiment of the invention is characterized by the strip being made of a spring wire, of a plastic or of a composite material.

In accordance with a second aspect, the invention relates to a headrest. Such a headrest is known from prior notorious use. It comprises a head part that is mounted to a vehicle seat.

It was the object of the invention to create a headrest that made a flexible arrangement of an actuation system possible.

The task was solved by means of a headrest with the features of claim 1.

The headrest comprises a head part that can be positioned on a vehicle seat. The headrest comprises at least one straight guide according to one of the claims 1 to 6.

In accordance with one embodiment, a first end section of the holding bar is positioned in a mount that is part of the head part. The holding bar is positioned relative to the mountain in a movable manner so that the head part can be moved relative to the holding bar. In this way, the head part is, for example, height adjustable. A second end section of the holding bar is, for example, permanently mounted within a holder that can be attached to a vehicle seat, in particular on the backrest.

In addition or as an alternative, a second end section of the holding bar is positioned in a mount that is part of a holder that can be attached to the vehicle seat. The second end section of the holding bar can then be moved with relation to the mount. In this way, the head part, for example is vertically adjustable.

In accordance with another embodiment of the invention, a head part of the headrest mounted onto a vehicle seat comprises a base part as well is a headrest part. The headrest part can be positioned on the base part with the support rods, wherein the mount is permanently arranged on the base part. The support rods are, for example, permanently arranged on the headrest part. One end section of the support rod that faces away from the headrest part is movably guided within the mount. In this way, the headrest part is movably mounted with relation to the base part. The head part can, for example, be moved toward the head of a passenger or away from the head of a passenger. Other advantages of the invention are revealed through one exemplary embodiment depicted in the drawings.

Figure 2:
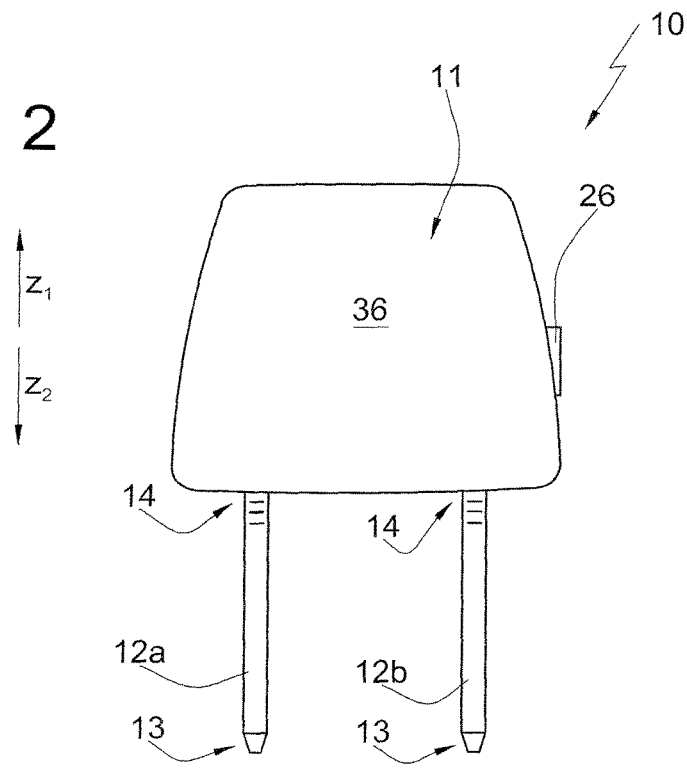
Figure 3:
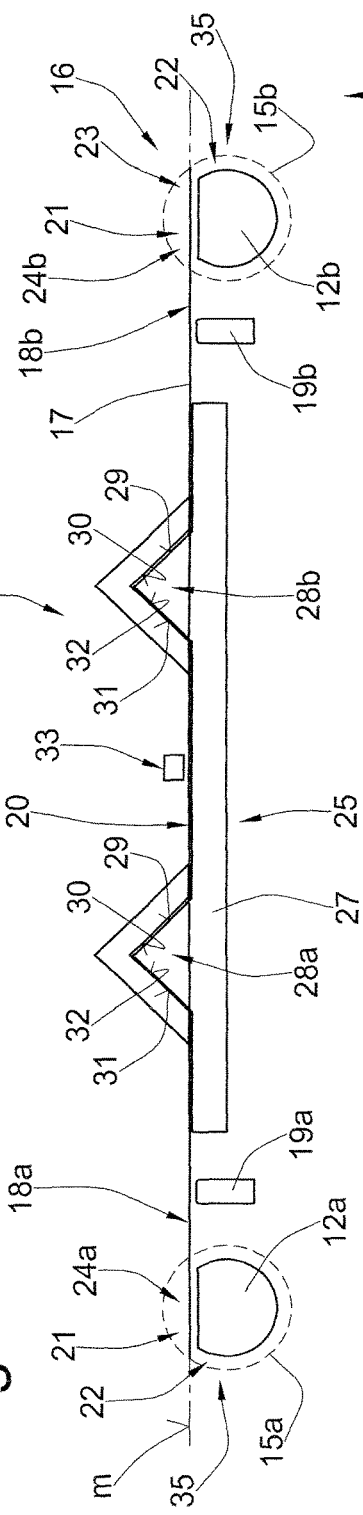

The schematic drawings show:

FIG. 1 a front view of a headrest with a head part in a first lower position,

FIG. 2 according to FIG. 1, the headrest, wherein the head part is arranged in a second upper position, FIG. 3 a sectional view of the headrest in accordance with cutting line in FIG. 1, wherein a latch is arranged in a locked position.

Figure 4:
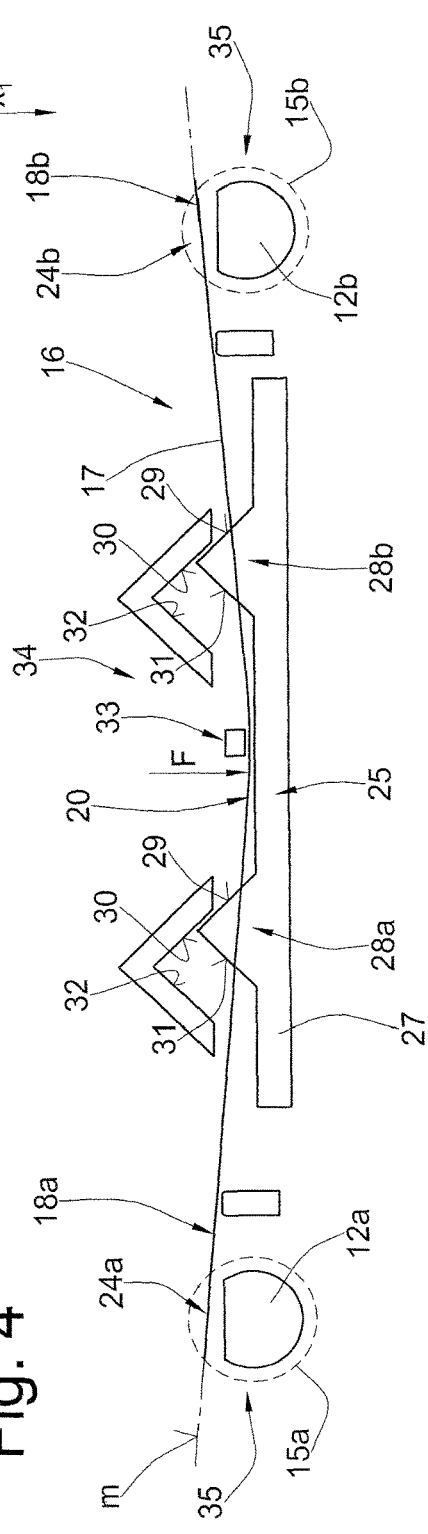

FIG. 4 according to FIG. 3, the headrest, wherein the latch is arranged in a released position, FIG. 5 according to FIG. 3, a cross-section illustration of a second exemplary embodiment of the headrest, wherein the latch is arranged in the locked position, FIG. 6 the headrest in accordance with FIG. 5, wherein the latch is arranged in the released position.

Altogether, the headrest is indicated in the drawings with the reference number 10. The same reference numbers in the various drawings indicate corresponding parts, even if small letters are placed after or omitted.

In accordance with a first exemplary embodiment of the invention, the headrest 10 comprises a head part 11 with a headrest surface 36 that can be mounted using two support rods 12a and 12b on a vehicle seat, in particular on a backrest of the vehicle seat. Thereby, the end sections 13 of the support rods 12a and 12b are not mounted within the holders shown that are attached to the vehicle seat. The end sections 13 are permanently locked into the holders so that a relative movement between the holder and the end section 13 is not possible.

An upper end section 14 of the holding bars 12a is movably mounted within a mount 15a (not shown in FIGS. 1 and 2) and an end section 14 of the support rod 12b is movably mounted in a mount 15b in such a way that the head part 11 can be moved in the directions $z_1$ and $z_1$ with relation to the support rods 12a and 12b. The mounts 15a and 15b are permanently connected to the head part 11. The head part 11 forms with the support rods 12a and 12b a straight guide 35. A lower end position is shown in FIG. 1. The head part 11 can be moved from the lower end position into the direction $z_1$ into the upper end position (see FIG. 2) or into a position between the lower end position and the upper end position. The head part 11 can be moved from the upper end position into the direction $z_2$ into the lower end position (see FIG. 2) or into a position between the upper end position and the lower end position.

The headrest 10 comprises a latch 16, that is shown in the FIGS. 3 and 4. In FIG. 3, the latch 16 is in a locked position and in FIG. 4, the latch is arranged in a released position that will be explained in more detail in the following.

The latch 16 comprises an elastically deformable strip 17 that is permanently held in an immovable manner on the head part 11. The strip 17 is attached to the head part 11 in such a way that it can be functionally deformed between primarily a straight state and a bent state. A longitudinal axis of the strips 17 is indicated with m. The strip 17 is arranged in such a way next to abutments 19a and 19b that are spaced away from each other, that the strip 17 functionally deforms into a bent shape if a force F acts on the central area 20 of the strip 17 that is arranged between the end sections 18a and 18b.

Furthermore, the strip 17 is arranged relative to mounts 15a and 15b in such a way that end sections 18a and 18b can move through an opening 21 into an interior space 22 of the mount 15a and 15b, in which the support rod 12a and support rod 12b is guided. In the locked position, the end section 18a meshes into a notched catch 23 of a structure 24a of a plurality of notched catches 23 space away from each other in direction $z_1$ and $z_2$ on the support rod 12a.

Along the same lines, the end section 18b meshes into a notched catch 23 of a structure 24b of a plurality of notched catches 23 space away from each other in direction $z_1$ and $z_2$ on the support rod 12b. The strip 17 is subject, for example, in to a pre-tensioning that forces the end segment 18a into the direction $x_1$ meshed with the notched catch. In accordance with an alternative embodiment however, the strips 17 could also be slackened if it is meshed with a notched catch 23 of the structures 24a and 24b.

If the end segments 18a and 18b are meshed with a notched catch 23, the latch 16 is arranged in the locked position in accordance with FIG. 3. The head part 11 cannot be moved, for example, into direction $z_1$ nor in direction $z_2$. That is, for example, the case if the notch 23 is formed in such a way that a movement direction $z_1$ or $z_2$ in the locked position is prevented. In accordance with an alternative embodiment, the notch 23 can be formed in such a way that the and segments 18a and 18b automatically move from the locked position into a released position when force is applied to the head part 11 into the direction z1, so that the head part 11 can be moved into direction z1, but not into direction z2.

If the and segments 18a and 18b are not arranged within the notches 23, the latch 16 is in the released position (see FIG. 4).

The headrest 10 comprises an actuator 25 that has a actuator 26 and a slider 27. The actuator 26 and the slider 27 are, not shown, movably connected to each other in such a way that the slider 27 moves into direction $y_1$ if the actuator 26 is moved into direction y1. The slider 27 is guided on the head part 11 in such a way that it can be moved into direction $y_1$ and $y_2$ and into direction $x_1$ and x2. In FIG. 3, the actuator 25 is in a first position, in which the latch 16 is in the locked position. In FIG. 4, the actuator 25 is situated in a second position, in which the latch is in the released position.

The slider 27 is provided with a movement deflector 34 that comprises protrusions 28a and 28b that are separated from each other. The protrusions 28a and 28b have deflection services 29 that are respectively parallel to one another that are tilted into the directions $y_1$ and y2.

The deflection surface 29 interact with the complementary countersurfaces 30 that are formed on the head part 11 and are inclined in the same manner. The inclination of the deflection services 29 and the countersurfaces 30 is such, that in the case of the slider 27 moving out of the position shown in FIG. 3 into direction y1, the slider 27 also moves and direction x1.

Furthermore, on the protrusions 28a and 28b, parallel deflection surface 31 are formed that are inclined into directions $y_1$ and y2. The deflection surface 31 interact with the complementary countersurfaces 32 that are inclined in the same manner. The inclination of the deflection surface 31 and the countersurfaces 32 is such, that in the case of the slider 27 moving out of the position shown in FIG. 3 into direction y2, the slider 27 also moves and direction x1. In this way, the actuator 25 could also be actuated if the actuator 26 is located on an opposite site of the head part 11 with regard to the actuator shown in FIGS. 1 and 2 and the slider 27 is actuated into direction y2.

The slider 27 is provided with an actuating projection 33. If the slider 27 is moved into direction x1, the actuating projection 33 exerts a force F on the strip 17 so that the latch 16 is moved into the release position while the strip 17 is functionally deformed into the bent position and the end sections 18a and 18b are moved so they disengage with the notches 23. In the released position, the head part 11 can be moved into directions $z_1$ and $z_2$ with relation to the support rods 12a and 12b.

If the switch 26 is no longer actuated into direction y1, the restoring force moves the strip 17 into the shape in accordance with FIG. 3 and thereby also moves the slider 27 into the first position in accordance with FIG. 3. In other words, the actuator is automatically moved into the first position if the burden on the actuator 26 is eased and the latch is moved into the locked position.

A second exemplary embodiment is shown in FIGS. 5 and 6. It only differs from the first exemplary embodiment by the fact that the two strips 37a and 37b are held on the head part 11 and to actuating projections 38a and 38b that are spaced away from each other are connected to the slider 27. The end section 18a is part of the strip 37a and the end section 18b is part of the strip 37b. When actuating the slider 27 out of the position in accordance with FIG. 5. into direction $y_1$ or into direction y2, the slider 27 is moved into direction x1. From the actuating projections 38a and 38b, forces F are respectively exerted on the central segment 39a of the strip 37a and on a central segment 39b of the strip 37b, whereby the end segments 18a and 18b are moved into the released position so they disengage with the notch 23 (see FIG. 6).

The restoring force of the strips 37a and 37b automatically move the latch 16 into the locked position and the actuator 25 automatically moves into the first position in accordance with FIG. 5 if the actuator 25 is no longer actuated.

The invention claimed is:

1. A straight guide comprising:
   a mount;
   two support rods each movably guided with in the mount, at least one of the rods being formed with a notch;
   a latch for securing the support rods relative to the mount, the latch having an elastically deformable strip permanently fixed to the mount and having at least one freely movable end section engageable with the notch on the one of the two support rods and part of a structure comprising the notch so the latch can be moved between a released position in which the strip is elastically deformed in such a way that the end section is disengaged from the structure and a locked position in which the end section meshes with the structure;
   a slider with an actuating projection that can be moved in a first direction and in a second direction transverse to the first direction; and
   a movement deflector for moving the slider in to the first direction on actuation of the deflector in the second direction such that the actuating projection moves the latch into the released position.

2. The straight guide according to claim 1 wherein the strip is supported by two abutments and that the actuating projection interacts with a central section of the strip.

3. The straight guide according to claim 1, wherein the slider comprises two actuating projections and the strip has two of the end sections, each actuating projection interacts with a respective one of the end sections.

4. The straight guide according to claim 1, wherein the strip is a spring wire of a plastic or of a composite material.

5. A headrest with a head part that can be mounted to a vehicle seat, wherein the headrest comprises at least one straight guide according to claim 1.

6. The headrest according to claim 5, wherein a first end section of each holding bar is mounted within a mount that is part of the head part.

7. The headrest according to claim 5, wherein a second end section of each support rod is mounted in a part of a holder that can be attached to the vehicle seat.

8. A straight guide comprising:
   a mount;
   two support rods each movably guided in the mount, at least one of the rods being formed with a notch;
   a latch for securing the support rods relative to the mount, the latch having an elastically deformable strip permanently fixed to the mount and having at least one freely movable end section engageable with the notch on the one of the two support rods and part of a structure comprising the notch so the latch can be moved between a released position in which the strip is functionally deformed in such a way that the end section is disengaged from the structure and a locked position in which the end section meshes with the structure;
   a slider with an actuating projection that can be moved in both a first direction and in a second direction; and
   a movement deflector for moving the slider in the first direction on actuation of the deflector in the second direction such that the actuating projection moves the latch into the released position, the movement deflector having a first deflection surface and at least a first countersurface and that the first deflector surface is part of the mount and the countersurface is part of the slider, the deflection surface and the countersurface extending diagonal to the second direction in such a way that they redirect the slider into the first direction in the case of a movement in to the second direction.

9. The straight guide according to claim 8, further comprising, mirror inverted to the first actuating surface in the first countersurface, a second actuating surface and a second counter surface.

* * * * *